US009614473B1

(12) United States Patent
Qian (10) Patent No.: US 9,614,473 B1
(45) Date of Patent: Apr. 4, 2017

(54) FLUX WEAKENING AC MOTOR CONTROL BY VOLTAGE VECTOR ANGLE DEFLECTION

(71) Applicant: Infineon Technologies AG, Neubiberg (DE)

(72) Inventor: Weizhe Qian, Beijing (CN)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/998,300

(22) Filed: Dec. 24, 2015

(51) Int. Cl.
  *H02P 21/00* (2016.01)
  *H02P 6/08* (2016.01)
  *H02P 6/06* (2006.01)
  *H02P 21/22* (2016.01)
  *H02P 27/08* (2006.01)

(52) U.S. Cl.
  CPC ............ *H02P 21/0021* (2013.01); *H02P 6/06* (2013.01); *H02P 6/08* (2013.01); *H02P 21/0089* (2013.01); *H02P 21/22* (2016.02); *H02P 27/08* (2013.01)

(58) Field of Classification Search
  CPC ........ H02P 21/00; H02P 21/06; H02P 21/146; H02P 2207/05; H02P 23/12; H02P 1/42; H02P 4/00; H02P 5/00; H02P 6/00; H02P 6/06; H02P 23/00; H02P 25/00; H02P 27/00; H02P 27/04; H02P 27/06; H02P 3/18
  USPC .... 318/400.02, 400.14, 400.15, 400.32, 599, 318/700, 721, 727, 799, 800, 801, 811, 318/430, 432, 437; 363/21.1, 40, 44, 95, 363/120, 174, 175
  See application file for complete search history.

(56) References Cited

U.S. PATENT DOCUMENTS

| 6,163,128 | A | 12/2000 | Hiti et al. |
| 8,604,735 | B2 | 12/2013 | Filka et al. |
| 9,116,527 | B2 * | 8/2015 | Maeda ................... G05D 13/62 |

OTHER PUBLICATIONS

Bae, Bon-Ho et al., "New Field Weakening Technique for High Saliency Interior Permanent Magnet Motor", IEEE, Industry Applications Conference, 2003. 38th IAS Annual Meeting. Conference Record of the, vol. 2, Oct. 2003, pp. 898-904.
Kim, Jang-Mok et al., "Speed Control of Interior Permanent Magnet Synchronous Motor Drive for the Flux Weakening Operation", IEEE Transactions on Industry Applications, vol. 33, No. 1, Jan./Feb. 1997, pp. 43-48.

(Continued)

*Primary Examiner* — Antony M Paul
(74) *Attorney, Agent, or Firm* — Murphy, Bilak & Homiller, PLLC (57) ABSTRACT

A method for controlling a three phase AC motor includes generating an operating point error signal based upon a difference between a reference operating point and an actual operating point. A first control method is used to determine a first motor control vector, whereby magnitude and angle values of the first control vector are determined. A second control method is used to determine a second control vector from the operating point error signal, whereby the second control vector is a voltage vector with a constant magnitude. A pulse width modulated voltage is applied to the AC motor. The pulse width modulated voltage is dependent upon the first motor control vector when the AC motor is operating below voltage output saturation. The pulse width modulated voltage is dependent upon the second motor control vector when the AC motor is operating at voltage output saturation.

16 Claims, 10 Drawing Sheets

(56) References Cited

OTHER PUBLICATIONS

Milosevic, Mirjana, "Decoupling Control of d and q Current Components in Three-Phase Voltage Source Inverter", available online at: https://www.eeh.ee.ethz.ch/uploads/tx_ethpublications/milosevic_decoupling_control.pdf, publication date unknown, pp. 1-11.
Simon, Erwan, "Implementation of a Speed Field Oriented Control of 3-phase PMSM Motor using TMS320F240", Digital Signal Processing Systems, Texas Instruments, Sep. 1999, pp. 3-84.
Wai, Jackson et al., "A New Control Technique for Achieving Wide Constant Power Speed Operation with and Interior PM Alternator Machine", Industry Applications Conference, 2001. Thirty-Sixth IAS Annual Meeting. Conference Record of the 2001 IEEE, vol. 2, Chicago, IL, Sep./Oct. 2001, pp. 807-814.

\* cited by examiner

FLUX WEAKENING AC MOTOR CONTROL BY VOLTAGE VECTOR ANGLE DEFLECTION

TECHNICAL FIELD

The instant application relates to electric motor control, and more particularly relates to flux weakening control of three phase synchronous AC motors.

BACKGROUND

Interior permanent magnet synchronous motors (IPMSMs) have gained widespread use in a variety of applications, including automotive applications such as electric vehicle traction motors, micro-hybrid belt-driven starter generator (BSG) motors in 48V systems, and electric power steering. IPMSMs offer many attractive characteristics including high power density, high efficiency, reluctance torque availability, and wide speed operating ranges.

An IPMSM has a characteristic base speed that must be accounted for in any control scheme. The base speed refers to a speed at which the rotor of the IPMSM cannot be accelerated by supplying additional current to the stator windings. There are many applications for IPMSMs that require the motor to be operated beyond its base speed. This is possible using a technique known as flux weakening. Flux weakening involves reduction of the permanent magnet flux linkage, i.e., the rotor field. Although this allows the rotor to spin faster, this reduction in the rotor field reduces the amount of torque generated by the motor. That is, as the IPMSM is accelerated past its base speed, the amount of torque generated by the motor decreases. The operational region below the base speed is commonly referred to as the constant torque region, whereas the region above the base speed is commonly referred to as the constant power region.

One known flux weakening technique involves voltage feedback control. See Kim et al., *Speed Control of Permanent Magnet Synchronous Motor Drive for the Flux Weakening Operation*, IEEE Transactions. vol. 33, no. 1, pp. 43, 48, February 1997. One drawback of this technique is that it requires relatively complicated calculation steps that can consume substantial computing resources. Furthermore, according to this technique, the maximum DC voltage of the power supply cannot be fully utilized. Instead, this technique requires a margin between the maximum DC voltage and a user-defined voltage reference output, which is required so that the current control can take effect before the motor enters the saturation region. Thus, the motor is not able to achieve its maximum speed using voltage feedback control.

Another known flux weakening technique involves a current vector control technique. See Jackson Wai, T. M. Jahns, *A New Control Technique for Achieving Wide Constant Power Speed Operation with an Interior PM Alternator Machine*, in Conf. Rec. IEEE IAS Ann. meet, vol. 2, pp. 807-814, 2001. According to this technique, during flux weakening, a current vector angle is controlled. One drawback of this technique is that the current vector locus can only be approached and never actually reached. This is because the current regulator loses control after voltage saturation.

SUMMARY

A method for controlling a three phase AC motor is disclosed. According to an embodiment, the method includes generating an operating point error signal based upon a difference between a reference operating point of the AC motor and an actual operating point of the AC motor. A first control method is used to determine a first three phase motor control vector from the operating point error signal, whereby magnitude and angle values of the first three phase motor control vector are determined. A second control method is used to determine a second three phase motor control vector from the operating point error signal, whereby the second three phase motor control vector is a voltage vector with a constant magnitude and only an angle value of the second three phase motor control vector is controlled. A pulse width modulated voltage is applied to the AC motor. The pulse width modulated voltage is dependent upon the first three phase motor control vector when the AC motor is operating below voltage output saturation. The pulse width modulated voltage is dependent upon the second three phase motor control vector when the AC motor is operating at voltage output saturation.

A control circuit for controlling a three phase AC motor is disclosed. According to an embodiment, the control circuit is configured to generate an operating point error signal based upon a difference between a reference operating point of the AC motor and an actual operating point of the AC motor. The control circuit is further configured to determine a first three phase motor control vector from the operating point error signal, whereby magnitude and angle values of the first three phase motor control vector are determined using a first control method. The control circuit is further configured to determine a second three phase motor control vector from the operating point error signal, whereby the second three phase motor control vector is a voltage vector with a constant magnitude and only an angle value of the second three phase motor control vector is controlled using a second control method. The control circuit is further configured to apply a pulse width modulated voltage to the AC motor. The control circuit is configured such that the pulse width modulated voltage is dependent upon the first three phase motor control vector when the AC motor is operating below voltage output saturation, and such that the pulse width modulated voltage is dependent upon the second three phase motor control vector when the AC motor is operating at voltage output saturation.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 4, which includes FIGS. 4A and 4B, illustrates waveforms of d-q axis currents, d-q axis voltages, a voltage saturation selection signal, and a voltage control vector angle for a speed controller that does utilize voltage vector angle control, according to an embodiment.

DETAILED DESCRIPTION

According to embodiments described herein, a method for controlling a three phase AC motor (e.g., an IPMSM) and a corresponding controller are disclosed. The inventors will show that when the IPMSM is operated above its base speed, the d-q axis voltage control vector values saturate. As a result, the speed or toque of the IPMSM can be controlled in the saturation region by a control technique whereby only the vector angle of the d-q axis voltage control vector is adjusted, and the magnitude of the d-q axis voltage control vector remains constant. This technique offers several advantages over known control techniques, such as less complexity and computational resources, and higher motor speeds at saturation due to the full utilization of the DC supply voltage.

According to one embodiment, a three phase AC motor is controlled by two different control schemes, depending on whether the motor is operating below the saturation region or in the saturation region. When the motor is below saturation, a first control technique is employed. The first control technique may be any of a variety of control techniques. According to one embodiment, the first control technique is a feedforward vector oriented control technique in which the magnitude and angle of a current control vector is determined using a lookup table. Once the motor speed reaches the base speed and the motor reaches the saturation region of operation, a second control technique that is different from the first control method is implemented by the controller. According to the second control technique, a d-q axis voltage control vector with a constant magnitude is generated. Only the angle of the d-q axis voltage control vector is controlled by the second control technique. This angle control is done using a reference command signal (e.g., by proportional integral control). The controller is configured to switch between the first and second control techniques, responsive to a selection signal from a motor saturation detector. This allows the motor to seamlessly switch between the first control technique, which achieves maximal efficiency in the constant torque region, and the second control technique, which utilizes minimal processing resources to achieve maximum speed in the constant power region.

Figure 1:
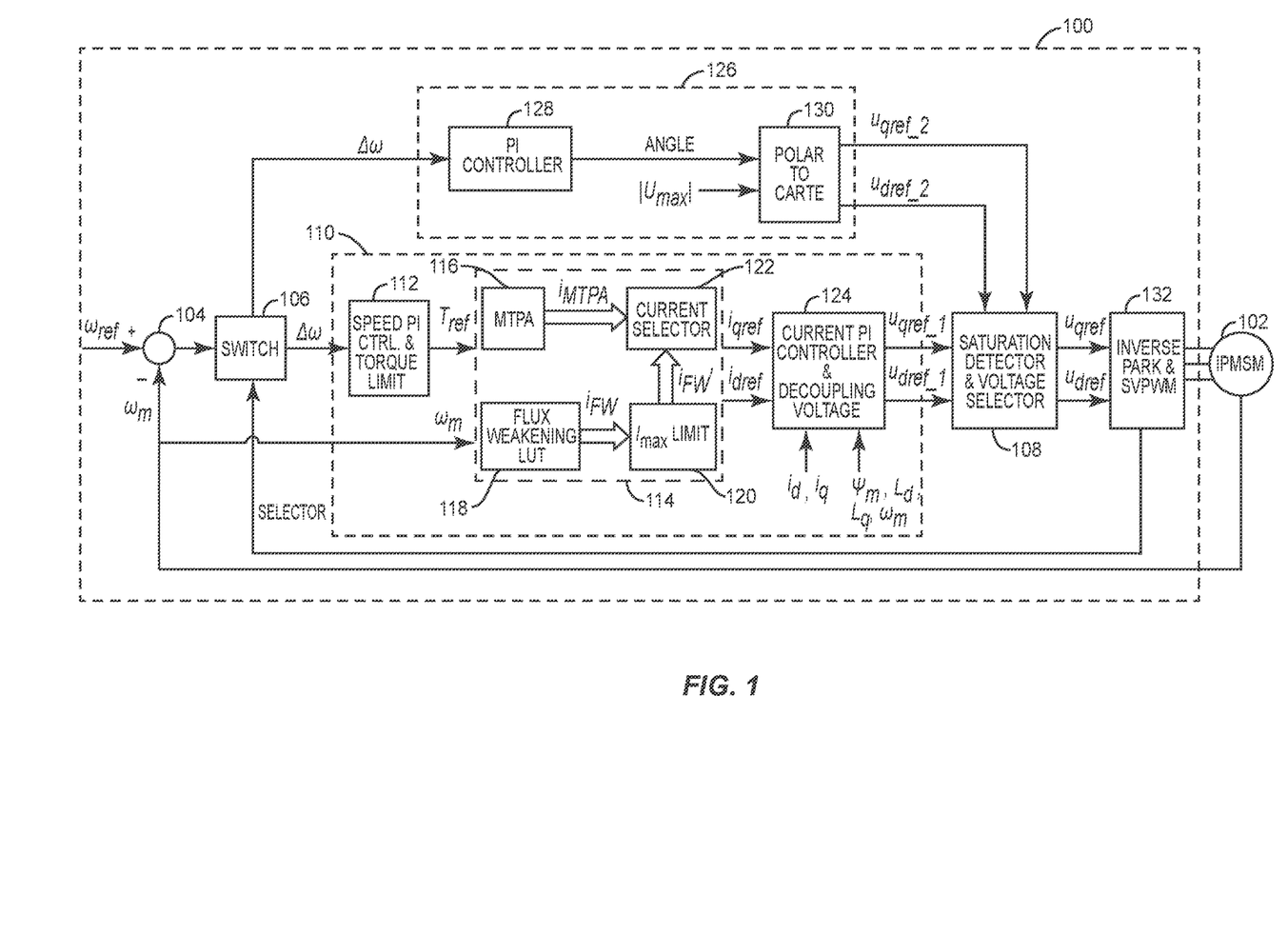
FIG. 1 illustrates a block diagram of a speed control circuit for controlling rotor speed of a three phase AC motor, according to an embodiment.

Referring to FIG. 1, a block diagram of a controller 100 for controlling rotor speed of an electric motor 102 is depicted. The controller 100 may be implemented by a variety of different hardware configurations. In general, the controller 100 may be embodied by one or more integrated circuits (ICs) being configured to implement the described techniques. That is, the controller 100 may include a plurality of circuits that are schematically required to conform to the described requirements. According to an embodiment, the controller 100 is implemented in a single micro-controller that is programmed to implement all of the functions of the block diagram.

The electric motor 102 is a three phase synchronous AC motor that can be controlled by a three-phase time varying voltage. According to an embodiment, the electric motor 102 is an interior permanent magnet synchronous motor (IPMSM). The controller 100 is configured to apply three-phase time varying voltage to the various stator windings of the motor 102, and to adjust the speed of the motor 102 using an operating point error signal. The operating point error signal is determined from a difference between a reference operating point (e.g., speed, torque, current, power, etc.) and the actual operating point of the motor 102. In the embodiment of FIG. 1, the operating point error signal is a speed error signal $\Delta\omega$. That is, the operating point error refers to a difference between a desired speed and an actual speed of the motor 102. In the controller 100 of FIG. 1, the speed error signal $\Delta\omega$ is generated from a differentiator 104 that determines the difference between a reference speed $\omega_{ref}$ of the motor 102 and an actual speed $\omega_m$ of the motor 102. The reference speed $\omega_{ref}$ of the motor 102 is provided by a user input. The actual speed $\omega_m$ of the motor 102 is determined from direct or indirect measurements of the motor 102.

The controller 100 includes a switch 106. The switch 106 also the speed error signal $\Delta\omega$ from the differentiator 104 as well as inputs. The switch 106 is configured to feed the speed error signal $\Delta\omega$ to two different outputs, based upon a state of the selection signal.

The controller 100 further includes a first control block 110. The first control block 110 generates a first three phase motor control vector that is used to control the motor 102 using a field oriented control (FOC) technique. FOC involves transformation of a three-phase time varying AC voltage that is to be applied to the various stator windings of the motor 102 into a two dimensional vector quantity. More specifically, FOC includes performing Clarke and Park transformations that transform the three-phase time varying AC voltage into a two dimensional vector. The Clarke transform transforms a space vector from a three phase coordinate system into a stationary two phase reference. The Park transform transforms the vector into the d-q reference plane, which rotates synchronously with the electrical angular velocity of the motor 102. In the d-q reference plane, the direct (d) axis represents the direct axis of the rotor flux. The quadrature (q) axis is orthogonal to the d-axis, and represents the axis of the motor torque along which the stator field must be developed. FOC techniques greatly simplify three phase motor control, as the two-dimensional vector quantity can be adjusted by algorithms and circuits that are relatively simple compared to those that would be required to perform the necessary calculations in three dimensions. Both components of the two-dimensional vector quantity (i.e., the rotor flux component and the motor torque component) can be controlled separately. After the two-dimensional motor control vector has been adjusted according to the FOC control algorithm, the two-dimensional motor control is transformed vector back into a three-phase time varying AC voltage using reverse Park and Clarke transformations.

According to an embodiment, the first control block 110 is configured as a feedforward flux weakening controller. In general, feedforward control refers to a technique whereby the signal control is not dependent upon a direct measurement of a motor parameter (e.g., speed, torque, etc.), and instead responds to a given set of inputs in a predefined way.

The first control block 110 includes a speed controller and torque limiter 112 that receives the speed error signal $\Delta\omega$ from one of the outputs of the switch 106. The speed controller and torque limiter 112 includes a first proportional integral (PI) controller that receives the speed error signal $\Delta\omega$ and generates a torque reference signal $T_{REF}$ using proportional integral control. Proportional integral refers to any technique whereby a difference between a measured process variable and a desired setpoint is calculated as a motor error value, and this difference is integrated over time to generate a new motor control parameter that seeks to reduce the size of the error. In this example, the first proportional integral (PI) integrates the speed error signal $\Delta\omega$ to generate a desired torque operation point of the motor 102 that seeks to reduce the size of the error. The speed controller and torque limiter 112 is additionally configured to limit the torque reference signal $T_{REF}$ generated by the first proportional integral (PI) controller 100 according to predefined limits. This torque limiting can be done according to a motor power profile, for example.

The first control block 110 further includes a d-q axis current vector generator 114. The d-q axis current vector generator 114 generates a current vector that is defined by a reference current value $i_{QREF}$ in the quadrature axis and a reference current value $i_{DFREF}$ in the direct axis. The current vector is generated using the torque reference signal $T_{REF}$ and the actual motor speed $\omega_m$ as inputs.

The current vector generator 114 includes a maximum torque per ampere (MTPA) current vector generator 116. The MTPA current vector generator 116 maps the torque reference signal $T_{REF}$ to a stored torque curve that provides motor control current vectors in the direct and quadrature axes according to a profile that is optimized for maximal torque at minimum current magnitude. This is one example, and the MTPA could instead be replaced by a profile that generates the motor control current vector to be aligned purely with the q-axis, for example.

The current vector generator 114 further includes a flux weakening look up table (LUT) 118. The values stored in the flux weakening LUT 118 correspond to values for the motor current vector required to initiate flux weakening control for when the actual motor speed $\omega_m$ of the motor 102 reaches the base speed. That is, the flux weakening LUT 118 is configured to generate a d-q axis current vector that includes a flux weakening component (i.e., a downward adjustment to the rotor field) to enable operation of the motor 102 beyond its base speed. These predetermined values in the LUT 118 can account for operational factors such as loss and parameter variation caused by saturation and temperature effects. These values can be established from a dynamometer test, or by a mathematical simulation.

The current vector generator 114 further includes a maximum current limiter 120. The maximum current limiter 120 receives the flux weakened control vector from the flux weakening LUT 118 and compares it with defined operational limits dictated by the motor, inverter, battery, etc. For example, the maximum current limiter 120 may be configured to limit the current of the motor 102 to 248 Amperes peak/175 Amperes phase current.

The current vector generator 114 further includes a current selector 122. The current selector 122 may be a switch, for example, that receives the flux weakened current control vector from the flux weakening LUT 118 and the MTPA current control vector from the MTPA current vector generator 116. When the motor 102 is operating at speeds below its base speed, the current selector 122 outputs the d-q axis reference current values $i_{DREF}$, $i_{QREF}$ based upon the MTPA control current vector. When the motor 102 reaches its base speed, the current selector 122 outputs the d-q axis reference current values $i_{DREF}$, $i_{QREF}$ based upon the flux weakened control current vector generated by the flux weakening LUT 118. Thus, the current vector generator 114 is configured to generate the reference current values $i_{DFREF}$, $i_{QREF}$ in both in the constant torque region (i.e., below base speed) and in the constant power region (at or above base speed).

The first control block 110 further includes a second PI controller 124. The second PI controller 124 receives the current control current vector from the current vector generator 114. The second PI controller 124 generates d-q axis reference voltage values $U_{QREF}$, $U_{DREF}$ based upon the reference current values $i_{DFREF}$, $i_{QREF}$ generated by the current vector generator 114 using a proportional integral control technique as previously described.

The controller 100 further includes a second control block 126 that is in parallel with the first control block 110 and is configured to independently generate a second control vector for the motor 102. The second control block 126 is configured to perform FOC for the motor 102 according to a different technique than the first control block 110. The second control block 126 performs FOC by generate a voltage vector with a constant magnitude and exclusively adjusting the angle of this voltage vector without any variation in the magnitude voltage vector. This is made possible by the following governing principles of IPMSMs.

The flux vector angle $\theta$ is given by Equation (1a):

$$\lambda_q/\lambda_d = \tan(\theta) \qquad (1a),$$

where $\lambda_d = L_d i_d + \psi_m$; and $\lambda_q = L_q i_q$.

Furthermore, the voltage model of the IPMSM in the d-q reference frame is given by equations (2a) and (2b):

$$u_d = R_i i_d + L_d di_d/dt - \omega_r L_q i_q \qquad (2a),$$

$$u_q = R i_q + L_q di_q/dt + \omega_r (L_d i_d + \psi_m) \qquad (2b).$$

If resistor loss is neglected and steady state is assumed, equations (2a) and (2b) reduce to equations (3a) and (3b):

$$u_d = -\omega_r L_q i_q = -\omega_r \lambda_q \qquad (3a),$$

$$u_q = \omega_r (L_d i_d + \psi_m) = \lambda_d \qquad (3b).$$

Substituting equations (3a) and (3b) into Equation (1a), the flux vector angle $\theta$ is defined by equation 4(a):

$$\tan(\theta) = \lambda_q/\lambda_d = -u_d/u_q \qquad (4a).$$

Accordingly, the flux vector angle $\theta$ can be controlled by controlling the voltage vector angle, which is determined by $u_d/u_q$.

The second control block 126 shown in FIG. 1 utilizes this principle. According to an embodiment, the speed error signal $\Delta\omega$ is fed from the switch 106 (when the PMSM 102 is operating at voltage output saturation) to a third PI controller 128. The third PI controller 128 performs proportional integral control to generate a voltage vector angle that will rectify the speed error signal $\Delta\omega$ with the actual speed of the motor 102.

The second control block 126 further includes a polar to Cartesian conversion circuit 130. The angle value generated by the third PI controller 128 and a constant voltage vector magnitude value are fed to the polar to Cartesian conversion circuit 130. That is, the polar to Cartesian conversion circuit 130 receives the motor control vector in polar coordinates. According to an embodiment, the constant voltage vector magnitude value is a maximum voltage vector magnitude value $U_{MAX}$. This value corresponds to $$\frac{Vdc}{\sqrt{3}},$$

wherein $V_{DC}$ is a maximum DC voltage for the motor 102. The polar to Cartesian conversion circuit. The Cartesian conversion circuit 130 expresses the motor control vector in terms of second voltage control values $U_{QREF\_2}$, $U_{DREF\_2}$.

Because the second control block 126 performs FOC by only calculating the voltage control vector angle and not the voltage control vector magnitude, the second control block 126 is greatly simplified in comparison to controllers that determine both the magnitude and angle of the control vector, e.g., the first control block 110. Furthermore, the second control block 126 does not compute any current quantities to perform FOC of the motor 102. Instead, the second control block 126 performs FOC exclusively from voltage quantities. As a result, the second control block 126 requires less computing resources and/or operates more efficiently than conventionally known control circuits.

The controller 100 further includes a reverse park transformation and SVPWM block 132. The reverse park transformation and SVPWM block 132 receives the first and second voltage control vectors (i.e., $U_{QREF}$ and $U_{DREF}$ and $U_{QREF\_2}$, $U_{DREF\_2}$) from the respective first and second control circuits 110, 126. The reverse park transformation and SVPWM block 132 is configured to perform a reverse park transformation on these rotating vectors so as to transform them into a stationary axis reference plane, i.e., the alpha ($\alpha$) and beta ($\beta$) reference plane. Furthermore, the reverse park transformation and SVPWM block 132 is configured to perform space vector pulse width modulation from the $\alpha$ and $\beta$ control values. That is, the reverse park transformation and SVPWM block 132 is configured to generate a three phase time varying AC voltage from the stationary axis reference plane voltage vector control signal. The three phase time varying AC voltage is generated using pulse width modulation.

The controller 100 further includes a saturation detector and voltage selector 108. The saturation detector and voltage selector 108 is configured to detect when the motor 102 is operating in the saturation region, which in turn is used to determine which one of the first and second control circuits 110, 126 is used to control the motor 102. The saturation detector and voltage selector 108 generates a selection signal that is used by the switch 106. When the motor 102 is operated at any speed between zero and its base speed, the selection signal indicates a non-saturation state. When the motor 102 reaches its base speed and the voltage output of the motor 102 saturates, the selection signal indicates a saturation state.

According to an embodiment, the saturation detector and voltage selector 108 uses the d-q axis reference voltage values $U_{QREF}$, $U_{DREF}$ generated from the the first control block 110 to generate the selection signal. That is, saturation detector and voltage selector 108 determines the saturation state of the motor 102 indirectly from the control values generated by the first control block 110. As previously explained, when the motor 102 is operating at a voltage saturation state, the voltage control vector magnitude remains constant. The saturation detector and voltage selector 108 uses this principle to determine when the reference voltage vector defined by the values $U_{QREF}$, $U_{DREF}$ has plateaued at peak magnitude. One advantage of this technique in comparison to a direct measurement technique is that direct measurement techniques typically require a hysteresis so that the controller 100 does not switch too frequently or incorrectly. By contrast, this indirect technique is inherently more accurate.

The selection signal is fed to the control terminal of the switch 106. The switch 106 in turn selects between one of the first and second control circuits 110, 126, depending on the state of the selection signal. When the motor 102 is operated below saturation (e.g., selection signal="0"), the speed error signal $\Delta\omega$ is fed to the first control block 110, and the first control block 110 generates the first voltage control vector in the manner described above. Once the motor 102 becomes saturated (e.g., selection signal="1"), the first control block 110 is bypassed by the switch 106, the speed error signal $\Delta\omega$ is fed to the second control block 126, and the second control block 126 generates the first voltage control vector in the manner described above. Accordingly, the control circuit 100 is configured to select between which control method is used (i.e., the feedforward method implemented by the first control block 110 or the vector angle control method implemented by the second control block 126), depending upon the saturation state of the motor 102.

The saturation detector and voltage selector 108 also determines which one of the voltage vectors should be fed to the reverse park transformation and SVPWM block 132. When the motor 202 is below voltage output saturation (e.g., selection signal="0"), the saturation detector and voltage selector 108 feeds the first motor control vector that is generated by the first control block 110 to the reverse park transformation and SVPWM block 132. When the motor 202 is at voltage output saturation (e.g., selection signal="1"), the saturation detector and voltage selector 108 feeds the second motor control vector that is generated by the second control block 126 to the reverse park transformation and SVPWM block 132.

Figure 2:
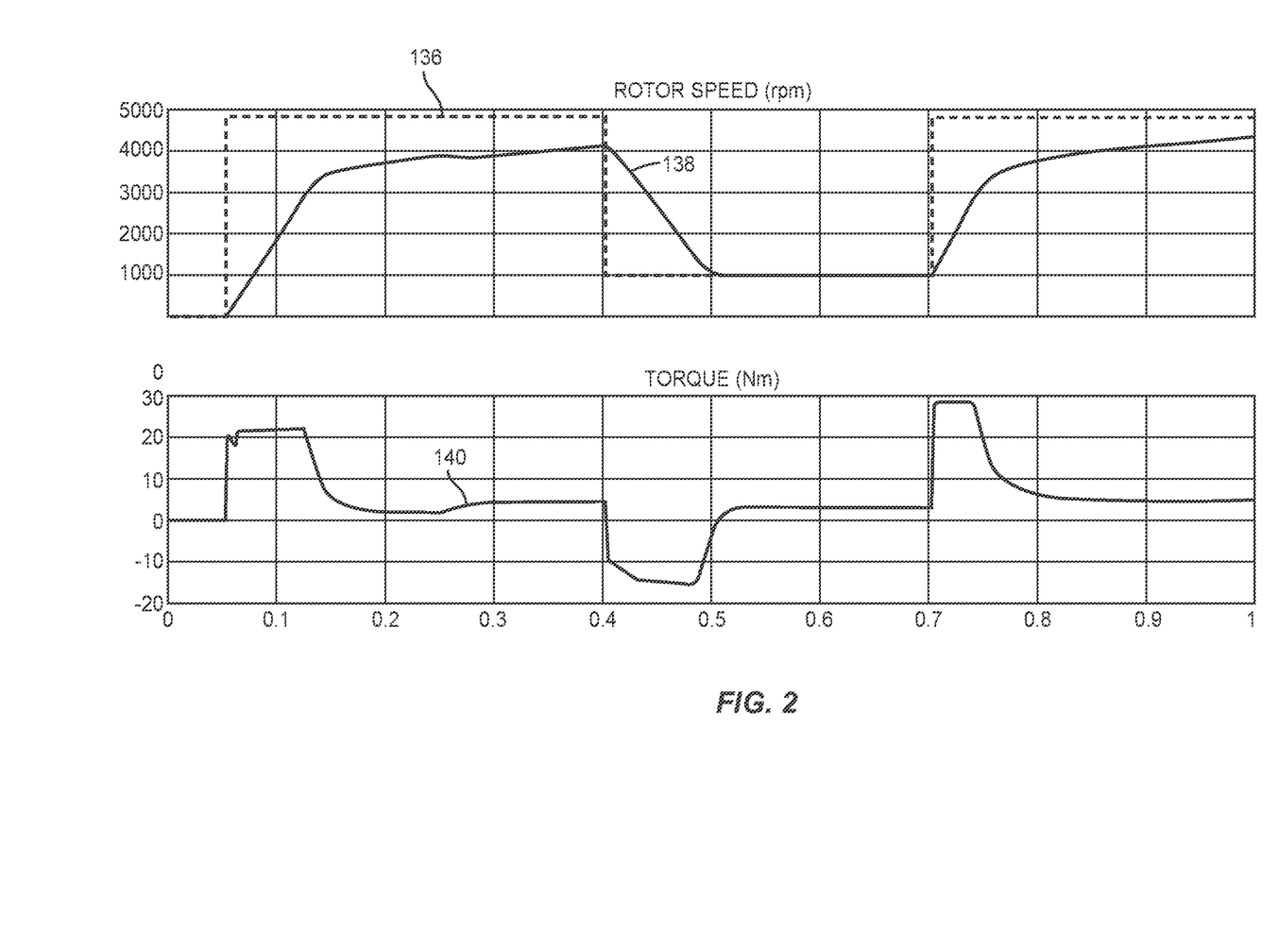
FIG. 2 illustrates waveforms of a speed reference signal, actual rotor speed and actual motor torque for a speed controller that does not utilize voltage vector angle control, according to an embodiment.

Referring to FIG. 2, output waveforms of the motor 102 are shown for a case in which the motor 102 is controlled without the second control block 126 described above. That is, the case of FIG. 2 shows a control technique in which flux weakening is performed by a feedforward lookup table method, and there is no angle only control when the motor 102 reaches voltage output saturation. The output waveforms include a motor speed command signal 136, an actual motor speed 138 and an actual motor torque 140.

The motor 102 is controlled to operate at varying speeds so as to transition from below voltage output saturation to voltage output saturation in a first transition and from voltage output saturation to below voltage output saturation in a second transition. To achieve these transitions, the motor 102 receives a sequence of speed commands (i.e., $\omega_{REF}$). First, the motor 102 receives a speed command transition of 0 revolutions per minute (RPMs) to 4800 RPMs at 0.05 seconds, then a transition to 1000 RPMs speed command at 0.4 seconds, and then a transition to 4800 RPMs speed command at 0.7 seconds. An external load of 0.3 Newton-Meters (Nm) is applied to the output of the motor 102 at 0.25 seconds.

As can be seen from FIG. 2, when feedforward flux weakening control is exclusively used under these switching conditions, the motor 102 is never able to achieve the desired speed $\omega_{REF}$. Whereas the speed reference $\omega_{REF}$ is set to 4800 RPMs, the motor 102 is only able to achieve a speed of approximately 4100 RPMs before the speed command transitions to a lower speed (1000 RPMs) at 0.4 seconds.

Figure 3:
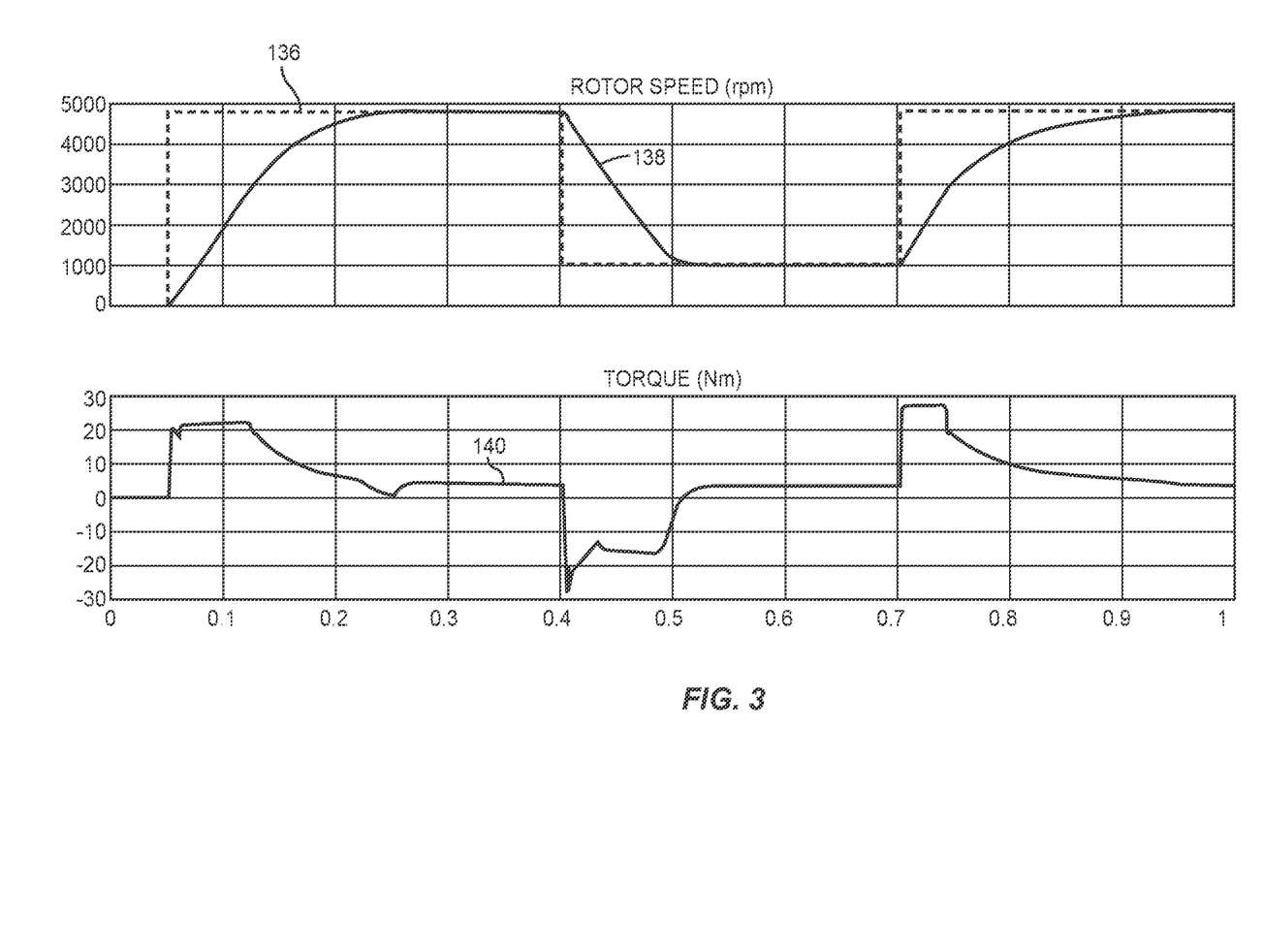
FIG. 3 illustrates waveforms of a speed reference signal, actual rotor speed and actual motor torque for a speed controller that does utilize voltage vector angle control, according to an embodiment.

Referring to FIG. 3, corresponding waveforms (i.e., motor speed command signal 136, actual motor speed 138, and actual motor torque 140) are shown for the same sequence of speed commands and loading as described above with reference to FIG. 2, but with the motor 102 being controlled by the controller 100 of FIG. 1 being used. That is, waveforms of FIG. 3 correspond to the motor 102 being controlled by feedforward flux weakening control when the motor 102 is operating below voltage output saturation and being controlled by voltage vector angle control when the motor 102 reaches voltage output saturation.

As can be seen, by using the controller 100 and control technique described herein, the motor 102 can be operated to reach the speed reference $W_{REF}$ of 4800 RPMs within the window of the speed transitions. This is because the voltage vector angle control technique that is performed by the second control block 126 allows for full of utilization $V_{DC}$, in contrast to the feedforward flux weakening control technique. Thus, the dynamic response of the system is greatly improved, as the motor 102 is able to respond to the speed reference $\omega_{REF}$ control signal much faster than the control scheme described with reference to FIG. 2.

Figure 4:
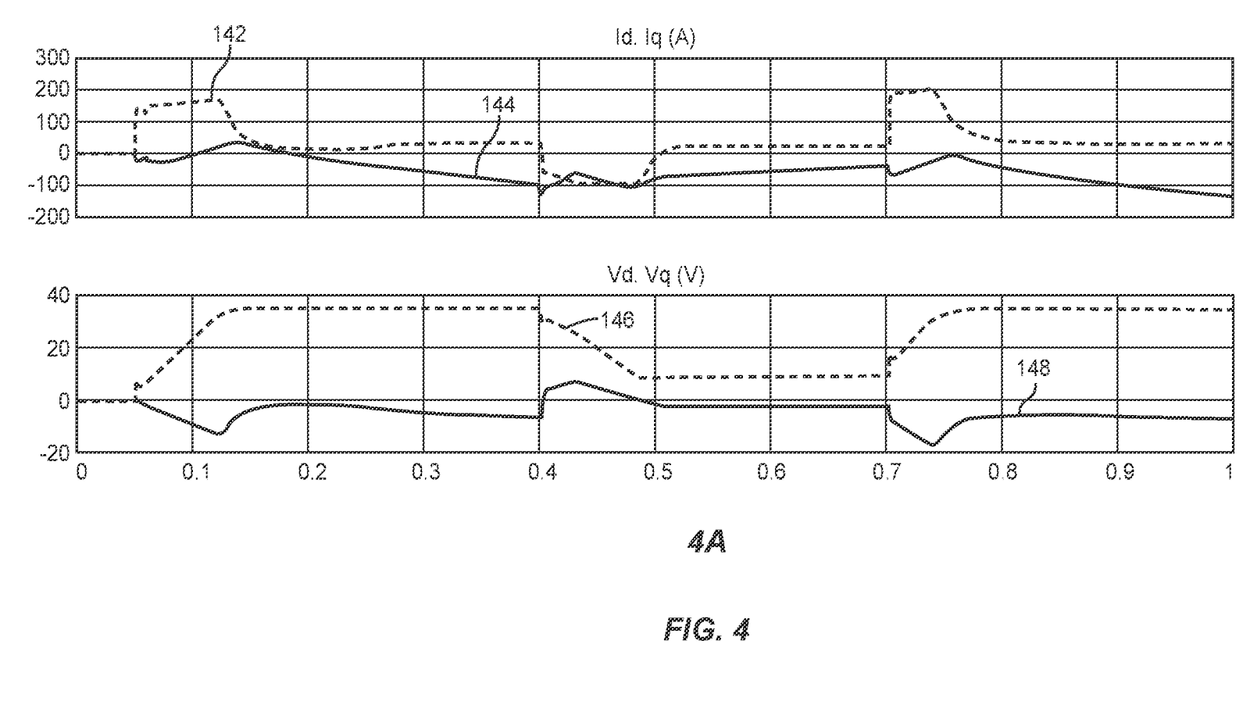

Referring to FIG. 4, additional control waveforms for the motor 102 being controlled as described with reference to FIG. 3 are shown. FIG. 4A depicts the q axis current 142 (in Amperes), the d axis current 144 (in Amperes), the q axis voltage 146 (in Volts), the d axis voltage 148 (in Volts. FIG. 4B depicts the magnitude 150 of the voltage control vector (in Volts) and the angle 152 of the voltage control vector (in degrees). As can be seen, once the motor 102 reaches saturation (at approximately t=0.125 seconds), the voltage control vector magnitude remains constant, while the angle control takes effect.

Figure 5:
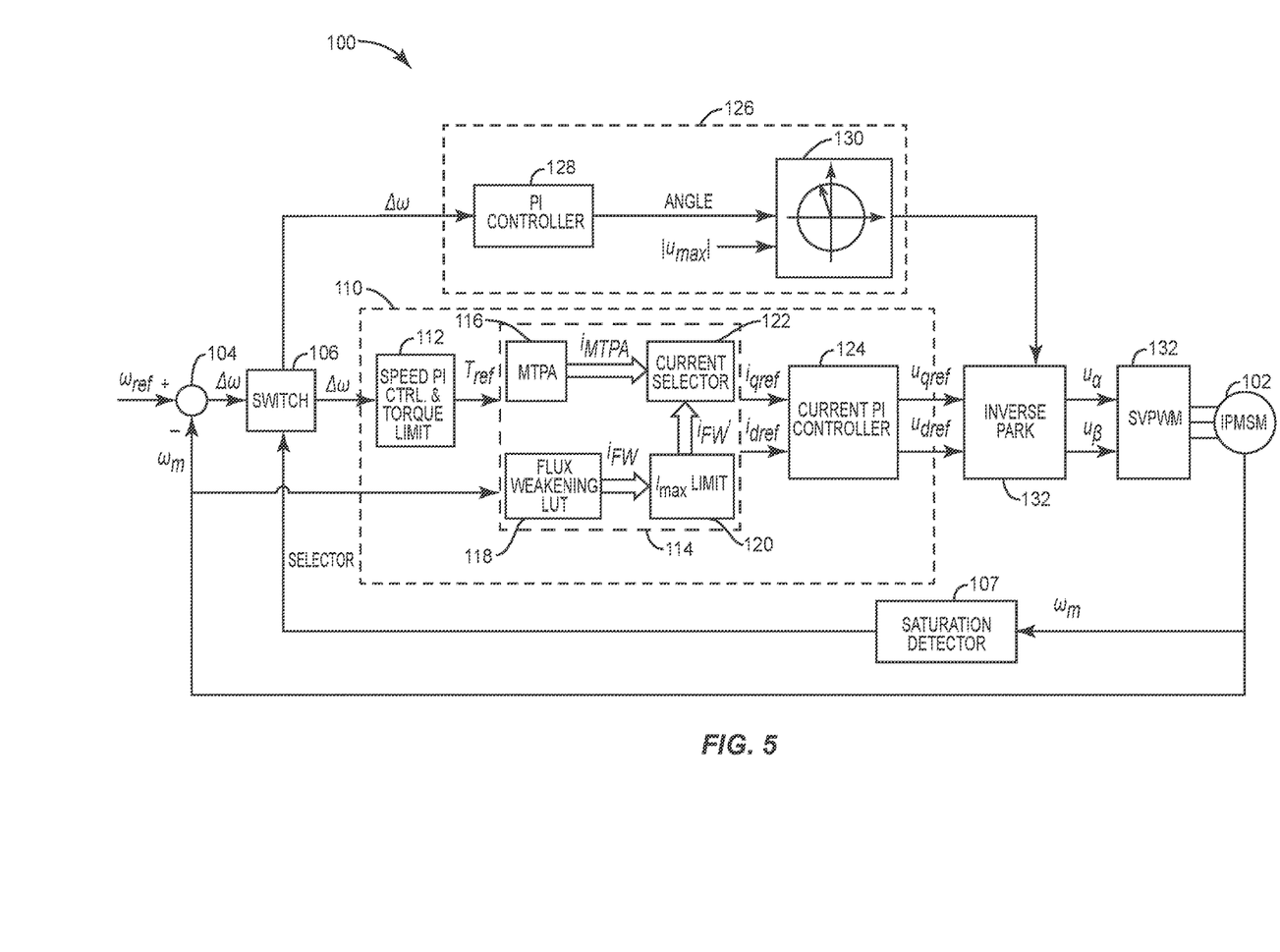
FIG. 5 illustrates a block diagram of a speed controller for controlling rotor speed of a three phase AC motor, according to an embodiment.

Referring to FIG. 5, a controller 100 is depicted, according to another embodiment. The controller 100 of FIG. 5 is identical to the controller 100 of FIG. 1 with the exception of the connection and operational principle of the saturation detector 136. The saturation detector 107 of FIG. 5 directly measures the motor speed $\omega_m$ value of the motor 102, and uses this measurement to generate the saturation selection signal. This is possible because there is a relationship between the speed of the motor 102 and the voltage saturation state. When the speed of the motor 102 equals the base speed. $\omega_m = \omega_b$, the saturation detector 107 can be configured to set the saturation selection signal at "1." When the speed of the motor 102 is below the base speed $\omega_m \leq \omega_b$, the saturation detector 107 can be configured to set the saturation selection signal at "0." One advantage of this technique in comparison to the indirect saturation detection technique described with reference to FIG. 1 is that it requires less computational resources, as the first control block 110 does not always need to be generating the voltage control vector values $U_{QREF}$ and $U_{DREF}$ for the saturation determination. However, hysteresis operation shall be used for this method. Selection of control strategy during hysteresis area is very important.

Figure 6:
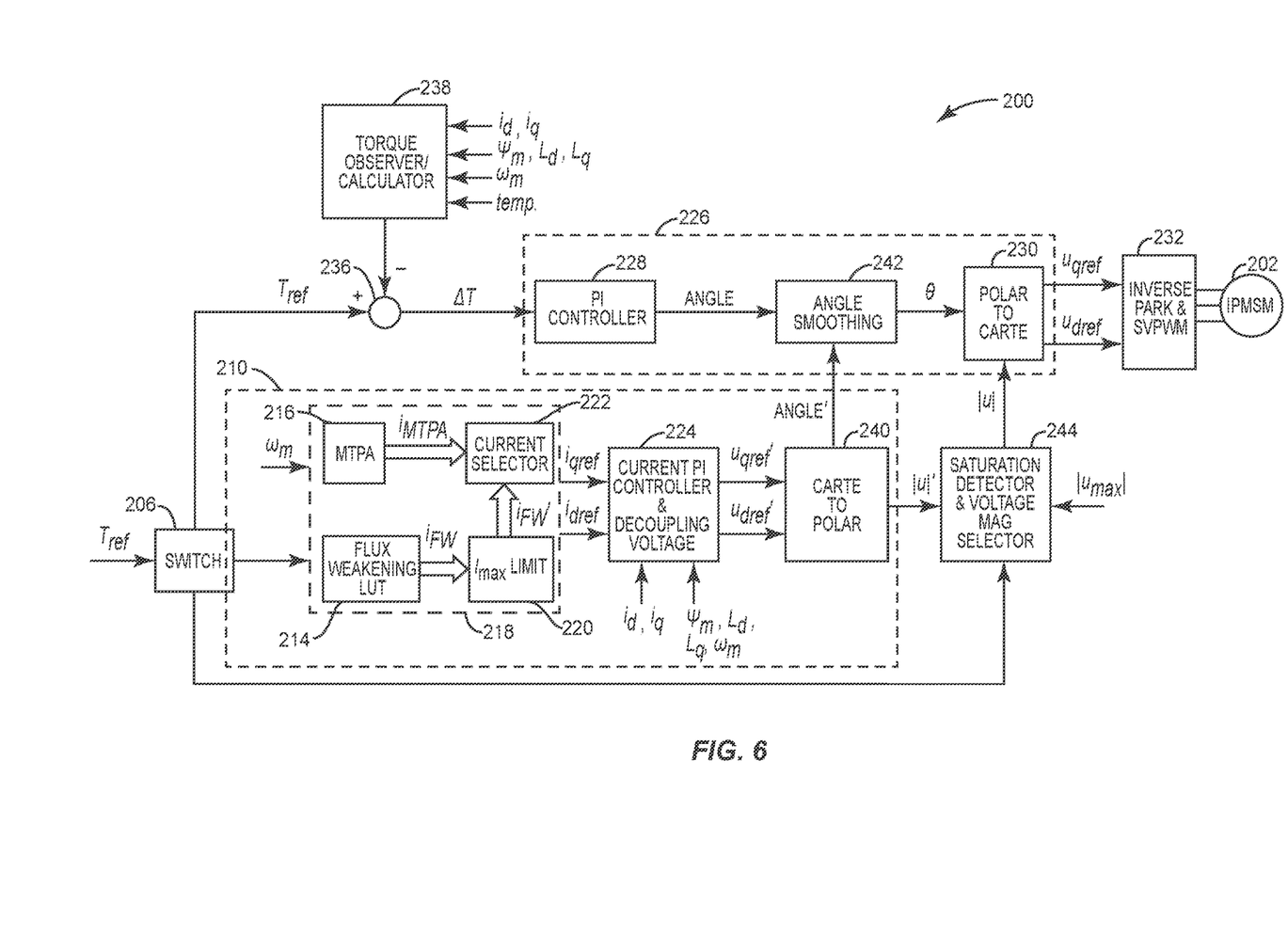
FIG. 6 illustrates a block diagram of a torque controller for controlling output torque of a three phase AC motor, according to an embodiment.

Referring to FIG. 6, a torque controller 200 is depicted, according to an embodiment. The torque controller 200 uses voltage vector angle control in a similar manner as with respect to the controller 100 described above, but is configured to control torque generation of the motor 202 instead of motor speed. In the embodiment of FIG. 6, the operating point error signal is a torque error signal $\Delta_T$. The torque error signal $\Delta_T$ is determined as a difference between a reference torque value $T_{REF}$ and an actual torque value $T_m$ of the motor. The reference torque value $T_{REF}$ of the motor 202 is generated from a user input. The actual torque value $T_m$ of the motor 202 is determined by a torque/observer calculator circuit 238. The torque/observer calculator circuit 238 determines the actual torque value $T_m$ based upon observed parameters of the motor 202 such as d-axis current $I_d$, q-axis current $I_q$, Flux linkage $\psi_m$, d-axis inductance $L_d$, q-axis inductance $L_q$, motor speed $\omega_m$, and motor temperature. The torque controller 200 includes a differentiator 238 that generates the torque error signal $\Delta_T$ by determining the difference between reference torque value $T_{REF}$ of the motor 202 and the actual torque value $T_m$ of the motor 202, which is provided by the torque/observer calculator circuit 238.

The torque controller 200 includes a first control block 210 configured to determine a first three phase motor control vector. The first control block 210 utilizes a similar principle of operation as the first control circuit 110 described with reference to FIG. 1. That is, the first control block 210 is configured to perform field oriented control (FOC) on the motor 202 using a feedforward flux-weakening technique. The first control block 210 includes a current vector generator 214 that generates a three phase motor control current vector using the torque reference torque value $T_{REF}$ along with the motor speed $\omega_m$. The first vector generator includes the maximum torque per ampere (MTPA) block 216, flux weakening look up table (LUT) 118, maximum current limiter 220, and current selector 222 that are configured similarly as the corresponding blocks discussed with reference to FIG. 1.

The first control block 210 further includes a first PI controller 224. The first PI controller 224 receives a current vector that is defined by a reference current value $i_{QREF}$ in the quadrature axis and a reference current value in the direct axis $i_{DFREF}$ from the current vector generator 214. The first PI controller 224 performs a proportional integral control function on the current vector and actual d/q-axes current feedbacks, and generates a voltage vector that is defined by a reference voltage value $U_{QREF}$ in the quadrature axis and a reference voltage value $U_{DREF}$ in the direct axis.

The first control block 210 further includes a Cartesian to polar converter 240. The Cartesian to polar converter 240 uses the voltage values $U_{QREF}$ and $U_{DREF}$ of the motor control vector to convert to polar coordinates to that the motor control vector can be expressed in terms of a magnitude (U') and angle θ'.

The torque controller 200 further includes a second control block 226 that performs angle only vector control in the manner previously discussed. The second control block 226 includes a second PI controller 228. The second PI controller 228 performs proportional integral control to generate a voltage vector angle that will rectify the torque error signal $\Delta_T$ with the actual torque of the motor 102.

The second control block 226 further includes an angle smoothing circuit 242. The angle smoothing circuit 242 receives the second motor control voltage vector angle and performs a filtering function between angles of the first and the second control methods. Therefore, a smooth transition can be realized between two angle outputs.

The second control block 226 further includes a polar to Cartesian conversion circuit 230. The angle value generated by the second PI controller 228 and a constant voltage vector magnitude value are fed to the polar to Cartesian conversion circuit 230. That is, the polar to Cartesian conversion circuit 230 receives the motor control vector in polar coordinates. According to an embodiment, the constant voltage vector magnitude value is a maximum voltage vector magnitude value $U_{MAX}$. This value corresponds to $$\frac{Vdc}{\sqrt{3}},$$

wherein $V_{DC}$ is a maximum DC voltage for the motor 102. The polar to Cartesian conversion circuit 230 expresses the motor control vector in terms of second voltage control values $U_{QREF\_2}$, $U_{DREF\_2}$.

The torque controller 200 further includes saturation detector and voltage magnitude selector 244. The saturation detector and voltage magnitude selector 244 detects whether the motor 202 is operating in a saturation region based upon the magnitude (U') of the first voltage control vector. When the motor 202 is below voltage output saturation, the voltage magnitude selector circuit 244 provides the magnitude (U') generated by the first control block 210 to the polar to Cartesian conversion circuit 230. When the motor 202 is operating at saturation, the voltage magnitude selector circuit 244 provides the magnitude $$= U_{Max} = \frac{Vdc}{\sqrt{3}},$$

wherein $V_{DC}$ is a maximum DC voltage for the motor 202, to the polar to Cartesian conversion circuit 230. The saturation detector and voltage magnitude selector circuit 244 also produces a selection signal that is fed to the switch 206 so that the switch 206 can feed the torque reference torque value $T_{REF}$ to one of the first or second control blocks 210, 226 based upon the state of the selection signal.

The torque controller 200 further includes a reverse park transformation and SVPWM block 232. The reverse park transformation and SVPWM block 232 receives the first and second voltage control vectors (i.e., $U_{QREF}$ and $U_{DREF}$ and $U_{QREF\_2}$, $U_{DREF\_2}$) from the respective first and second controllers 210, 226. The reverse park transformation and SVPWM block 232 is configured to perform a reverse park transformation on these rotating vectors so as to transform them into a stationary axis reference plane, i.e., the alpha (α) and beta (β) reference plane. Furthermore, the reverse park transformation and SVPWM block 232 is configured to perform space vector pulse width modulation from the α and β control values. That is, the reverse park transformation and SVPWM block 232 is configured to generate a three phase time varying AC voltage from the stationary axis reference plane voltage vector control signal. The three phase time varying AC voltage is generated using pulse width modulation.

Figure 7:
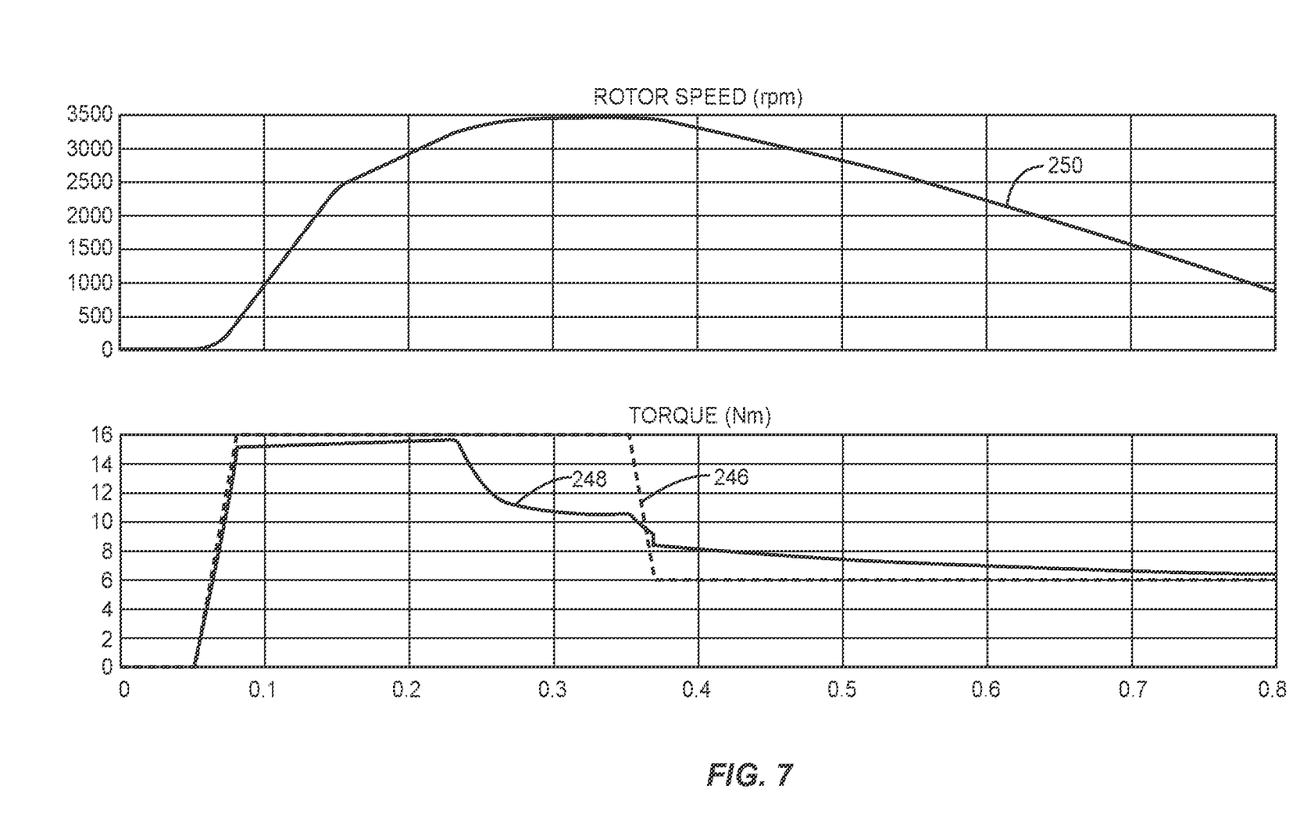
FIG. 7 illustrates waveforms of a motor torque reference, actual rotor speed and actual motor torque for a torque controller that does not utilize voltage vector angle control, according to an embodiment.

Referring to FIG. 7, output waveforms of the motor 202 are shown for a case in which the motor 202 is controlled by a controller that does not include the second control block 226 described above. That is, the case of FIG. 7 shows a control technique in which the motor control vector is generated by a feedforward flux weakening lookup circuit at all speeds. The output waveforms include a motor torque command signal 246, an actual motor torque 248 and an actual motor speed 250.

The motor 202 is controlled to operate at varying speeds so as to transition from below voltage output saturation to voltage output saturation in a first transition and from voltage output saturation to below voltage output saturation in a second transition. To achieve these transitions, the motor 202 receives a sequence of torque commands ($T_{REF}$). First, the motor 202 receives a torque command sequence of 0 newton-meters (NMs) to 16 NMs at 0.05 seconds, then a transition to 6 NMs torque command at 0.35 seconds. An external load of 10 NMs is added at 0.15 seconds.

As can be seen, the maximum speed that the motor 202 reaches is approximately 3500 RPMs. At approximately, 3250 RPMs voltage output saturation occurs in the motor 202, at which point the actual motor torque 248 of the motor drops. However, the motor continues to accelerate (to approximately 3500 RPMs) because the actual torque value $T_m$ of 16 NMs is higher than the load of 10 NMs.

Figure 8:
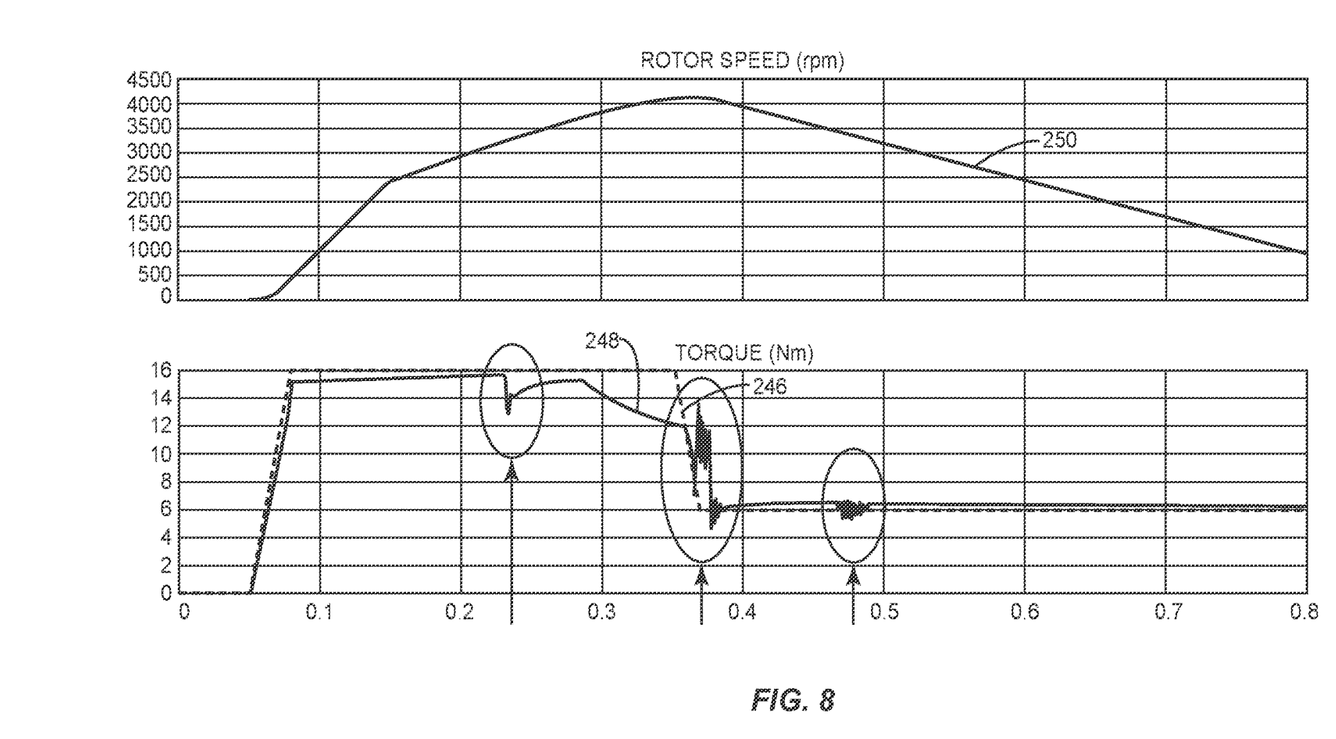
FIG. 8 illustrates waveforms of a motor torque reference, actual rotor speed and actual motor torque for a torque controller that does utilize voltage vector angle control, according to an embodiment.

Referring to FIG. 8, waveforms are shown for a motor 202 for the same input sequence, but with a controller 200 having the first and second control circuits 210, 226 discussed with reference to FIG. 6. That is, the motor 202 is controlled by a feedforward flux-weakening method when the motor 202 is below saturation, and is controlled by an angle only control method when the motor 202 reaches saturation. However, the control technique shown in FIG. 8 does not employ the angle smoothing circuit 242 shown in FIG. 6. Instead, the angle values θ and θ' are fed directly from the first and second controllers 210, 226 to the vector generation circuit in this example. At any time, either angle value θ or θ' is output from the controller.

As can be seen, the maximum speed that the motor 202 reaches is approximately 4000 RPM. At 0.23 sec, 0.37 sec, and 0.47 sec, voltage either saturates or de-saturates, and the controller 200 correspondingly switches between feedforward flux-weakening method and the angle only control method. At these transition points, torque spike or oscillation can be observed. This torque spike or oscillation is mainly attributable by voltage angle spike or oscillation that occurs when the angle only control method takes effect.

Figure 9:
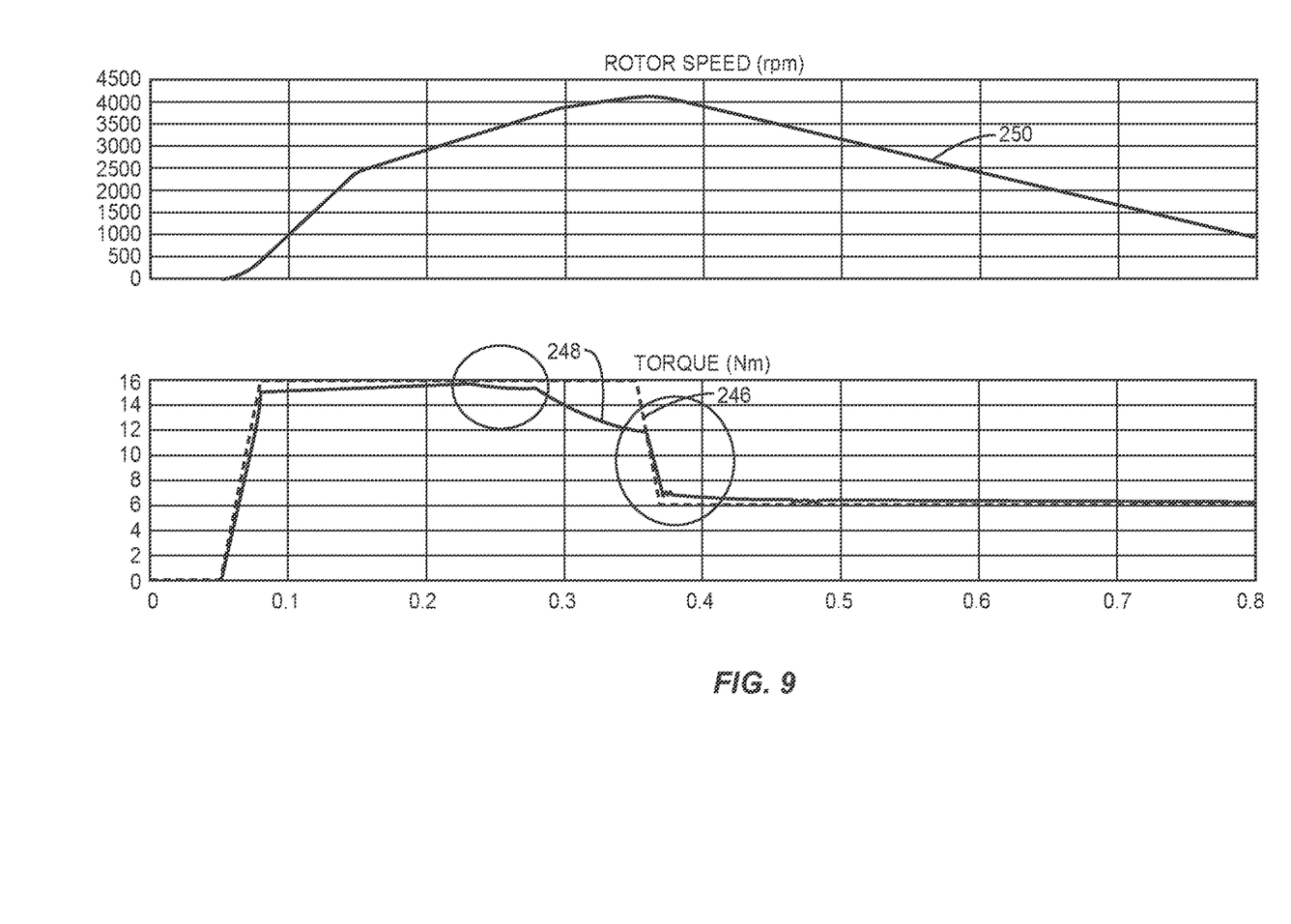
FIG. 9 illustrates waveforms of a motor torque reference, actual rotor speed and actual motor torque for a torque controller that does utilize voltage vector angle control, and utilizes angle smoothing, according to an embodiment.

Referring to FIG. 9, a waveform is shown for a motor 202 for the same input sequence as FIGS. 7-8 for a torque controller 200 that includes the angle smoothing circuit 242. That is, in comparison to the example of FIG. 8, the waveform of FIG. 10 shows the effect of angle smoothing. The angle smoothing circuit 242 prevents the dramatic voltage vector angle spike or oscillation described above with reference to FIG. 9. Therefore, the actual output torque 248 is smoothed, which can be a desirable feature in some applications, e.g., electric power steering (EPS).

The maximum speed that the motor 202 reaches is approximately 4000 RPM. At 0.23 seconds, voltage magnitude saturates and angle control takes effect. Torque output is maintained around the reference value for approximately 0.05 seconds, and then drops due to the power limitation of the IPMSM 202. When the torque reference $T_{REF}$ transitions from 16 newton-meters NMs to 6 newton-meters NMs (illustrated by the motor torque command signal 402), the torque value $T_m$ of the motor drops quickly to match this value at approximately 0.37 sec (illustrated by the actual motor torque 248 curve). At 0.37 sec and 0.47 sec, voltage magnitude either saturates or de-saturates.

As can be seen, the torque controller 200 can realize wider motor operation region and can increase system dynamic response. Furthermore, the system provides smooth torque switch in and out of the saturation region, due to the angle smoothing circuit 242.

What is claimed is:

1. A method for controlling a three phase AC motor, comprising:
   generating an operating point error signal based upon a difference between a reference operating point of the AC motor and an actual operating point of the AC motor;

using a first control method to determine a first three phase motor control vector from the operating point error signal, whereby magnitude and angle values of the first three phase motor control vector are determined;

using a second control method to determine a second three phase motor control vector from the operating point error signal, whereby the second three phase motor control vector is a voltage vector with a constant magnitude and only an angle value of the second three phase motor control vector is controlled; and applying a pulse width modulated voltage to the AC motor, wherein the pulse width modulated voltage is dependent upon the first three phase motor control vector when the AC motor is operating below voltage output saturation, and wherein the pulse width modulated voltage is dependent upon the second three phase motor control vector when the AC motor is operating at voltage output saturation.

2. The method of claim 1, wherein the second control method comprises performing proportional integral control on the operating point error signal to calculate the angle value of the second three phase motor control vector.

3. The method of claim 2, wherein the second control method comprises maintaining the second three phase motor current control vector at a constant value of $$\frac{V_{dc}}{\sqrt{3}},$$

wherein $V_{DC}$ is a maximum DC voltage of the AC motor.

4. The method of claim 3, wherein the first control method comprises a feedforward flux-weakening control method.

5. The method of claim 4, wherein the feedforward flux-weakening control method comprises:
generating a first motor control current vector from a maximum torque per-ampere curve when the AC motor is operating below its base speed;
generating a second motor control current vector from a look up table when the AC motor reaches its base speed, wherein values in the look up table incorporate a flux weakening component into the motor control current vector; and
performing proportional integral control on either the first or second motor control current vectors so to generate a first voltage control vector for the AC motor.

6. The method of claim 5, wherein the operating point error signal is a motor speed error signal, wherein the reference operating point of the AC motor is a reference speed of the AC motor, wherein the actual operating point of the AC motor is an actual speed of the AC motor, the method further comprising:
performing proportional integral control on the motor speed error signal to generate a reference torque value; and
using the reference torque value to generate the first motor control current vector from the maximum torque per-ampere curve.

7. The method of claim 5, wherein the operating point error signal is a motor torque error signal, wherein the reference operating point of the AC motor is a reference torque of the AC motor, wherein the actual operating point of the AC motor is an actual torque of the AC motor, the method further comprising:

measuring an operating speed of the AC motor; and
using the operating speed to generate the first motor control current vector from the maximum torque per-ampere curve.

8. The method of claim 3, further comprising:
operating the AC motor at varying speeds such that the AC motor transitions from below voltage output saturation to voltage output saturation in a first transition and from voltage output saturation to below voltage output saturation in a second transition;
disabling the first control method during the first transition such that the pulse width modulated voltage is only dependent upon the second three phase motor control vector when the AC motor reaches voltage output saturation; and
disabling the second control method during the second transition such that the pulse width modulated voltage is only dependent upon the first three phase motor control vector when the AC motor goes below voltage output saturation.

9. The method of claim 8, further comprising:
detecting whether d and q voltage axis values generated by the feedforward flux-weakening control method correspond to a voltage saturation state of the AC motor to generate a voltage output saturation signal; and
switching between the first and second control methods using the voltage output saturation signal.

10. The method of claim 8, further comprising:
directly measuring a speed of the AC motor to generate a voltage output saturation signal; and
switching between the first and second control methods using the voltage output saturation signal.

11. A control circuit for controlling a three phase AC motor, the control circuit being configured to:
generate an operating point error signal based upon a difference between a reference operating point of the AC motor and an actual operating point of the AC motor;
determine a first three phase motor control vector from the operating point error signal, whereby magnitude and angle values of the first three phase motor control vector are determined using a first control method;
determine a second three phase motor control vector from the operating point error signal, whereby the second three phase motor control vector is a voltage vector with a constant magnitude and only an angle value of the second three phase motor control vector is controlled using a second control method; and
apply a pulse width modulated voltage to the AC motor;
wherein the pulse width modulated voltage is dependent upon the first three phase motor control vector when the AC motor is operating below voltage output saturation, and
wherein the pulse width modulated voltage is dependent upon the second three phase motor control vector when the AC motor is operating at voltage output saturation.

12. The control circuit of claim 11, wherein the control circuit is further configured to:
determine whether the AC motor is operating at voltage output saturation and to generate a selection signal; and
switch between the first and second control methods, dependent upon the selection signal, so as to disable the first control method when the AC motor is operating at voltage output saturation.

13. The control circuit of claim 12, wherein the control circuit comprises a proportional integral controller, wherein the proportional integral controller is configured to receive the operating point error signal and generate the angle value of the voltage vector from the operating point error signal.

14. The control circuit of claim 13, wherein the control circuit comprises a flux weakening look up table, the flux weakening look up table being configured to incorporate a flux weakening component into the first three phase motor control vector.

15. The control circuit of claim 11, wherein the control circuit is configured to generate a speed error signal based upon based upon a difference between a reference speed of the AC motor and an actual speed of the AC motor.

16. The control circuit of claim 11, wherein the control circuit is configured to generate a torque error signal of the motor based upon a difference between a reference torque of the AC motor and an actual torque of the AC motor.

\* \* \* \* \*